2,974,145

PROCESS FOR RACEMIZING L 1-(p-METHOXY-BENZYL)-2-METHYL-1,2,3,4,5,6,7,8-OCTAHYDROISOQUINOLINE

Nathan Chadwick Hindley, Welwyn Garden City, England, assignor to Hoffmann-La Roche Inc., Nutley, N.J., a corporation of New Jersey No Drawing. Filed Nov. 21, 1958, Ser. No. 775,363

Claims priority, application Great Britain Nov. 29, 1957

1 Claim. (Cl. 260—289)

The present invention relates to a process for the racemization of optically active octahydro-isoquinoline derivatives, and to novel catalysts to effect said racemization.

In the specification of U.S. Patent No. 2,819,272 there is described a process for the racemization of optical octahydro-isoquinoline derivatives which consists in heating an optically active octahydro-isoquinoline derivative of the following formula

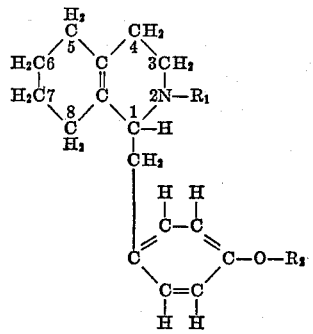

wherein $R_1$ is selected from the group consisting of hydrogen and hydrocarbon radicals having not more than 8 carbon atoms and $R_2$ is selected from the group consisting of hydrogen and lower alkyl radicals, in a liquid medium in the presence of a catalyst which consists essentially of palladium sponge deposited on a substrate comprising a mixture of zinc and iron hydroxides and/or zinc and iron carbonates. When carrying out this process the total yield of racemate is of the order of 60% of theory.

According to the process of the present invention, the optically active compounds mentioned hereinbefore are racemized by heating in a liquid medium in a hydrogen atmosphere under pressure with a catalyst which consists of copper deposited on a Raney cobalt substrate. The yields obtained are very much higher than those obtained in the prior process described hereinbefore.

It is preferred to use methanol as the liquid medium and it is preferred to use temperatures from about 100° C. to about 170° C. and a hydrogen pressure of about 30 to 40 atmospheres.

The novel catalysts of this invention are compositions which contain as essential catalytic ingredients copper deposited on a substrate of Raney cobalt. Compositions of this type have been found to be selective in the hydrogenation phase and at the same time highly active in the dehydrogenation phase and, this being so, they are of particular value in racemization processes. Thus, for example, use of these compositions permits the catalytic racemization of 1-(p-methoxybenzyl)-2-methyl-1,2,3,4,5,6,7,8-octahydro-isoquinoline in very high yield compared to that obtained when using hitherto known catalysts [see, for example, the specification of U.S. Patent No. 2,819,272]. A further advantage of the present catalysts is that they are subject only to slow deterioration as compared to the noble metal catalysts hitherto used for this purpose.

The amount of copper deposited on the cobalt substrate may vary from as little as 2 percent to about 50 percent based on the weight of the cobalt. The preferred amount of copper is about 16 percent by weight based on the cobalt content of the catalyst. When used in the aforementioned racemization process, the catalyst containing this preferred amount leads to racemizations of the order of 90 percent.

According to the process of this invention, the novel catalyst aforesaid is manufactured by treating Raney cobalt in an aqueous medium with a dilute aqueous solution of a copper salt. The Raney cobalt used for the preparation of the catalyst may be prepared from a Raney cobalt alloy by digesting same with caustic soda at moderate temperatures (e.g. 55°–60° C.) followed by repeated washing and decantation. It is preferred to vigorously agitate the Raney cobalt while adding the copper salt solution as the agitation promotes an even deposition of the copper on the cobalt.

Example 1

In the manufacture of the catalyst, 25 g. of Raney cobalt were vigorously stirred with water, dropwise adding thereto 3.75 cc. of a 10% w./v. aqueous copper sulfate solution diluted with 25 parts by weight of water and then washing by decantation. The resulting catalyst contains approximately 16 percent by weight of copper based on the Raney cobalt.

Example 2

120 kg. of 28% sodium hydroxide and 60 kg. of water were stirred together and heated to 60° C. 30 kg. of cobalt/aluminum alloy were then added within 1.5 to 2 hours and the temperature held at 60° C. by cooling. When all the alloy had been added the stirring was continued at 50°–60° C. for a further 2 hours. 80 kg. of water were then added and the stirring stopped when the temperature fell to 20° C. After allowing the mixture to stand for 20 minutes the aqueous fluid was syphoned off and the solid stirred with 150 kg. of water, the mixture allowed to stand and the liquid syphoned off from the solid which separated. This sequence of stirring with water, allowing to stand and syphoning was repeated until the pH of the aqueous component fell below 9. The thus obtained solid was treated with 150 kg. of water and stirred and a solution of 12.9 kg. of copper sulphate in 70 kg. of water added at about 20° C. The reaction took about 20 minutes and the mixture was stirred for a further 2 hours and then allowed to stand for 30 minutes. The supernatent aqueous solution was syphoned off and the remaining catalyst was repeatedly washed with 70 kg. of water, each washing being succeeded by allowing to settle and then syphoning. Usually 6 to 7 washings were required. The catalyst was then washed three times using a total of 45 kg. of methanol and then rinsed with 20 kg. of methanol and stored.

Example 3

5 g. of 1-(p-methoxy-benzyl)-2-methyl-1,2,3,4,5,6,7,8-octahydro-isoquinoline were dissolved in 17 ml. of methanol and 2.5 g. of cobalt/copper catalyst (containing 16 percent by weight of copper based on cobalt) were added thereto. The mixture was shaken for 16 hours at 106° C. in a hydrogen atmosphere under 40 atmospheres pressure. The mixture was then filtered, the solvent evaporated off and the residue was distributed between petroleum ether and water. The petroleum ether fraction was then evaporated to yield the required racemate. Racemization was 70%.

Example 4

5 g. of 1-(p-methoxy-benzyl)-2-methyl-1,2,3,4,5,6,7,8-octahydro-isoquinoline were dissolved in 17 ml. of methanol and 2.5 g. of cobalt/copper catalyst (containing 32 percent by weight of copper based on the cobalt) were added thereto. The mixture was shaken for 16 hours at 106° C. in a hydrogen atmosphere under 40 atmospheres pressure. The mixture was then filtered, the solvent evaporated off and the residue was distributed between petroleum ether and water. The petroleum ether fraction was then evaporated to yield the required racemate. Racemization was 74%.

Example 5

40 kg. of L-1-(p-methoxy-benzyl)-2-methyl-1,2,3,4,5,6,7,8-octahydro-isoquinoline were treated with 40 kg. of methanol and stirred until solution was attained. The solution was then treated with 0.4 kg. of decolorizing charcoal and filtered. The catalyst obtained in accordance with Example 2 of the first series of examples was made into a paste with 20 kg. of methanol and this paste and the foregoing filtered solution was placed in an autoclave. 1,200 liters of hydrogen were introduced into the autoclave at 20 atmospheres pressure while stirring. The temperature was raised to 140° C., whereupon the pressure rose to 30 atmospheres. A further 600 liters of hydrogen were then introduced, whereupon a pressure of about 38 atmospheres was achieved. The autoclave mixture was then stirred for 7 hours at 140° C. and 400 liters of hydrogen added in order to maintain the pressure. The mixture was then cooled to 30° C., the stirring stopped and the excess hydrogen removed. The mixture was then filtered and the filtrate evaporated. The residue was dissolved in 87 kg. of toluene and the toluene solution washed first with 50 kg. of water and then with 20 kg. of water. The aqueous phase was set to pH 9 by addition of about 1 kg. of sodium hydroxide and then extracted with 20 kg. of toluene. The toluene extract was washed two to three times using 10 kg. of water each time until the aqueous solution was neutral. The toluene extract and the previously obtained toluene solution were then combined and the resulting solution, which contained the desired racemate, worked up in the usual manner or resolved into the optical antipodes with the aid of tartaric acid.

I claim:

A process of racemizing L 1-(p-methoxy-benzyl)-2-methyl-1,2,3,4,5,6,7,8-octahydroisoquinoline which comprises heating the same, dissolved in a liquid medium consisting essentially of methanol, to a temperature of 100 to 170° C. and under a hydrogen pressure of about 30 to 40 atmospheres in the presence of a catalyst consisting essentially of copper deposited on a Raney cobalt substrate.

References Cited in the file of this patent

UNITED STATES PATENTS

| | | |
|---|---|---|
| 2,503,964 | Mosesman | Apr. 11, 1950 |
| 2,659,729 | Lott | Nov. 17, 1953 |
| 2,763,656 | Durig | Sept. 18, 1956 |
| 2,819,272 | Den Hollander | Jan. 7, 1958 |
| 2,849,408 | Bente | Aug. 26, 1958 |